Oct. 9, 1951     A. CAHAN     2,570,639

CONTAINER FOR BLOOD

Filed Feb. 24, 1949

INVENTOR
AMOS CAHAN
BY
ATTORNEYS

Patented Oct. 9, 1951

2,570,639

UNITED STATES PATENT OFFICE 2,570,639

CONTAINER FOR BLOOD

Amos Cahan, New York, N. Y.

Application February 24, 1949, Serial No. 78,119

7 Claims. (Cl. 128—214)

This invention relates to a container for blood and adapted for use during transfusions.

In the present state of the art, a round glass container with one opening in the top is used. The opening is provided with a sterilized stopper, the same stopper being utilized both in gathering and dispensing the blood. This arrangement necessitates an air vent leading through the stopper to the opposite end of the container to provide the necessary supply of air during transfusion. Moreover, during transfusion, present practice is to use a drip indicator containing a filter inserted in the stopper which may clog at a critical moment. It has also been found that the round containers of the present art are ill adapted for storage.

It is an object of the instant invention to provide a container into which the blood may be gathered without the necessity for holding it in the hand and agitating the contents as presently practiced.

A further object is to provide a container in which filters have been so incorporated that the danger from clogging during transfusion is obviated.

Still another object is the creation of a blood container that is readily stored in the usually limited refrigerated space available.

Other objects of the instant invention will become apparent in the course of the following specification.

In the accomplishment of these objectives, the container of the subject invention is made in the form of a square bottle in each end of which is an opening provided with a sterilized stopper. In the four corners of each end is a leg so that the bottle may be placed upright on either end. Either opening may be used for the inlet or outlet but the stopper for the preselected outlet has inserted on the inner end thereof a filter which extends upwardly in the bottle while an opening through the stopper provides a passage between the filter and a self-closing outlet designed for the removable insertion of the known drip indicator but without the usual filter. The subject blood container or bottle has been further improved, compared with the known art, by introducing a second filter of sand or the like therein. In addition, a handle member has been incorporated in such a manner that the bottle can be suspended from either end, and when not in use is releasably secured to the bottle and never accidentally in the way.

The invention will appear more clearly from the following detailed description when taken in connection with the accompanying drawings showing by way of example a preferred embodiment of the inventive idea.

Figure 2:
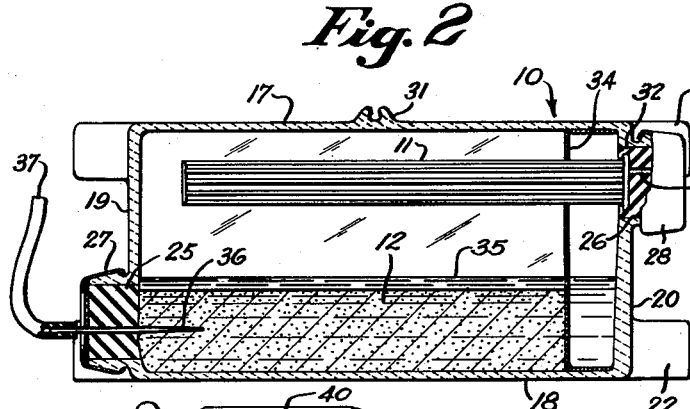
Figure 2 is a sectional view along the line 2—2 of Figure 1.

Referring now in greater detail to the drawings in which like reference numerals indicate like parts, reference numeral 10 indicates the container or bottle, 11 the first filter, 12 the sand filter, 13 the drip indicator, and 14 the handle member.

Figure 1:
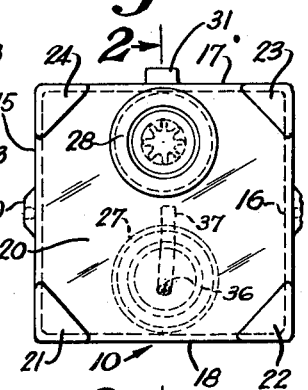
Figure 1 is an end view of the container or bottle constructed in accordance with the principles of this invention.

The container or bottle 10 is a hollow rectangular member of glass or other material and is constituted of the front member 15 (Fig. 1) spaced parallel with the back member 16; the top member 17 spaced parallel with the bottom member 18; and the spaced parallel end members 19 and 20, said members being integrally formed along corresponding edges. In each corner of the end member 20 are the integrally formed leg members 21, 22, 23, and 24 while the spaced parallel end member 19 is provided with similar leg members. These leg members are all triangular in cross-section. By this construction, the container 10 may be made to stand upright on either end. Obviously, other forms of legs could be used. An opening 25 is provided above the bottom member 18 and between the legs in the end member 19 while a similar opening 26 but on the opposite side is formed in the end member 20. Both of the openings 25 and 26 are closed by the sterilized stoppers 27 and 28, respectively.

Figures 3, 4, 5:
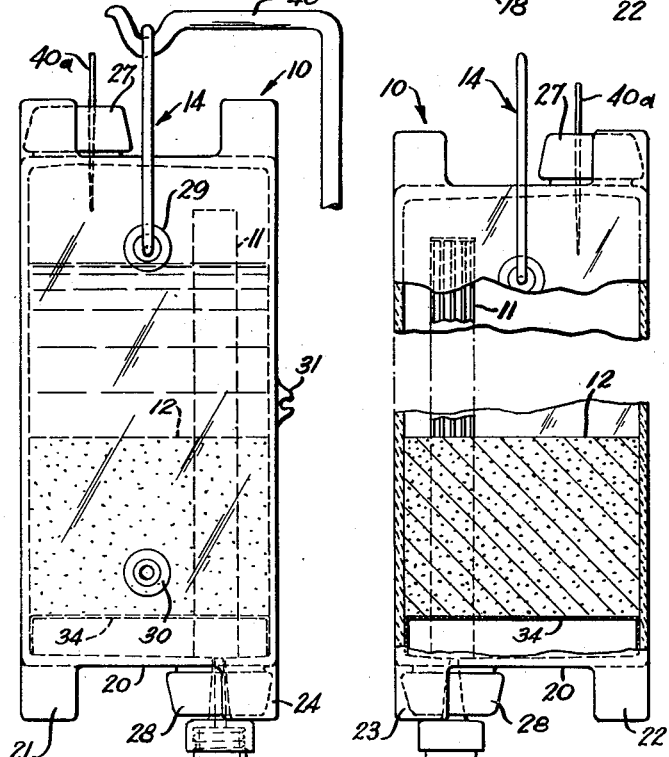
Figure 3 is an elevational view of the container suspended from one end and with the drip indicator inserted.
Figure 4 is an elevational view of the container with a part of the surface broken away to show more clearly the sand filter.
Figure 5 is an elevational view of the container showing the manner in which the blood separates.

At the top and bottom of one of the spaced parallel side, top, or bottom members, are the integrally formed pivotal handle supports 29 and 30 (Fig. 3) in opposed relationship to similar supports on the opposite member for the removable insertion of the free ends of the "U-shaped" handle member 14, the free ends being inwardly directed portions of the side members of the handle member 14 and the side members being of sufficient length so that the integrally formed horizontal member can be rotated above the ends of the legs when inserted in the corresponding pivotal supports as shown in Figures 3, 4, and 5. Designed to be releasably held in corresponding pivotal supports under tension, the handle member 14 is readily removed from either set of pivotal supports and inserted in the set at the opposite end in accordance with the end of the container that is to be suspended downwardly. The horizontal portion of the handle member 14 is so designed, approximately in the center, that an outwardly directed portion coacts with a catch 31 (Fig. 3) disposed on a contiguous surface portion to releasably maintain the handle member 14 out-of-the-way when not in use.

The sterilized stopper 27 is substantially of the known type but the sterilized stopper 28 has been modified in the following manner: The inwardly directed end of the stopper 28 has been provided with an inwardly directed integrally formed flange 32 (Fig. 2) for the removable insertion of the bottom of the filter 11 which may be of the known type or redesigned to extend substantially for the full length of the container 10 as shown. A passage 33 is also formed in the stopper 28, one end of the passage 33 being aligned with the usual opening in the end of the filter 11 and the opposite or outlet end made self-closing and adapted for the removable insertion of the end of the drip indicator 13 as shown in Figures 3, 4, and 5.

Within the container 10 is a sand filter 12 (Figs. 2, 3, 4, and 5) which is held above the spaced bottom member 20 by a screen 34 held in the bottom of the container 10 by any suitable means. Of course, a similar screen could be inserted in the opposite end of the container 10.

The filter 12 is located between the screen 34 and the inlet 36, and is adapted to cover the inlet in the horizontal position of the container 10, and to cover the screen 34 in the vertical position of the container 10.

The operation of the container 10 is as follows:

When gathering the blood into the container 10, the handle member 14 may be releasably secured by the catch 31. In the position shown in Figure 2 the sand filter 12 impregnated with the known solution 35 will be above the spaced parallel bottom member 18, and covering the stopper 27, the air above the solution 35 having been exhausted in the usual manner. The hollow needle 36 is passed through the stopper 27 and the outer end attached to the end of a tube 37 which leads to the person (not shown) from whom the blood is being taken in a known manner. The vacuum in the container 10 is sufficient to draw the blood from the person into the solution 35 with which it mixes in a known manner. The agitation caused by the blood being drawn into the solution 35 by the vacuum has been found to furnish sufficient mixing of the blood and solution without the necessity for holding the bottle 10 in the hand and shaking during the gathering operation as presently done. On standing, with the container 10 upright on either end, the gathered blood separates into the plasma, indicated by the reference numeral 38 (Fig. 5), and the cells, indicated by numeral 39. During transfusion, sometimes one or the other of the separated blood portions is required. Suppose the container 10 is suspended by the handle member 14 from the support 40 (Fig. 3) and that the blood has separated into the plasma 38 and cells 39 as shown in Figure 5. The end of the drip indicator 13 is inserted in the outlet of the passage 33 (Fig. 2) while through the stopper 27 (Fig. 3) a hollow needle 40a is passed which provides communication between the upper portion of the container 10 and atmospheric pressure without the necessity for the usual vent tube. If the cells 39 are desired, the same will pass through the filter 11, while some of the cells will pass through the sand filter 12 and the filter 11 but without any danger from clogging the drip indicator 13, since any particle in the cells 39 capable of clogging after passing through the sand filter 12 will clog only one or more openings of the filter 11 leaving the remainder of the openings of the filter 11 free for the passage of the cells, while that portion of the filter 11 below the screen 34 is free from clogging. Suppose further, that it is desired to inject the plasma 38 into the patient, then with the same equipment in the same position, it is only necessary to permit the cells 39 to be drained off whereupon the plasma 38 will fall to the bottom of the container 10 for filtering into the patient in the manner previously described for the cells. In storage, the square containers 10 may be stood upright in less space than a corresponding number of known round bottles per unit of blood stored or may be stacked one upon the other.

It is apparent the specific illustrations shown above have been given by way of illustration and not by way of limitation and that the structures above described are subject to wide variation and modification without departing from the scope or intent of the invention, all of which variations and modifications are to be included within the scope of the present invention, as defined in the claims in this application.

What is claimed is:

1. In a container for blood adapted for use in blood transfusions, the container having at least one opening, a stopper for the opening, at least one self-closing opening through the stopper, a drip indicator coacting with the outlet end of the self-closing opening and means introducing air into the opposite end of the container; an elongated filter disposed on the inwardly directed end of the stopper and extending upwardly into the container, the outlet of the filter communicating with the self-closing opening through the stopper, a second filter of granular material disposed in the container, and a screen support for the granular material above the opening, said granular material covering a portion of said elongated filter in the upright position of the container.

2. A container for blood adapted for use in blood transfusions comprising a hollow body member, the hollow body member comprising spaced parallel front and back members, spaced parallel top and bottom members, and spaced parallel end members, the end members having openings formed therethrough along opposite edges, said members being integrally formed along corresponding edges, a leg member disposed in the four corners of each end member, an antiseptic stopper for each of the openings, one of the stoppers having a self-closing opening therethrough and adapted for the insertion of an air vent, the other stopper having an inwardly directed flange around the inwardly directed end and a self-closing opening therethrough, a filter releasably disposed in the flange and extending upwardly in the container, the outlet of the filter communicating with the self-closing opening, a drip indicator releasably inserted in the outlet end of the self-closing opening; the container further comprising a "U-shaped" handle member, means releasably and pivotally securing the handle member at either end of the container, means releasably securing the handle member to the hollow body member; the container further comprising a second filter of granular material disposed therein, and a screen support for the granular material disposed in at least one end of the container.

3. A container for blood as set forth in claim 2 in which the leg members at each end of the container are characterized by being of triangular cross section and integrally formed with the container, the plane of the feet of the legs extending forwardly of the end of the stopper.

4. A container for blood as set forth in claim 2 in which the means releasably and pivotally securing the handle member at either end of the container comprises aligned pivotal handle supports integrally formed on opposed surfaces of the container adjacent each end member and adapted to coact with the free ends of the handle member.

5. A container for blood as set forth in claim 2 in which the means releasably securing the handle member to the hollow body member comprises a catch disposed on the outer surface of one of the spaced parallel members, the plane of which surface is parallel to the axis of the handle member, the catch having a slot formed therein, the slot being parallel to the axis of the handle member and adapted for the releasable insertion of the horizontal portion of the handle member.

6. In a container provided with an opening through which blood is gathered from a donor and injected into a patient, the opening being provided with a stopper, and a drip indicator connected with the stopper, and the stopper provided with a filter through which the blood passes prior to being injected; a second filter for the container, the second filter being of granular material and covering a portion of the first filter in the upright position of the container to separate clogging elements from the blood prior to passing through the stopper filter.

7. In a container adapted to store blood from a donor and to deliver the blood to a patient, the container having an inlet at one end through which the blood is gathered and an outlet at the opposite end; a screen disposed in the container in spaced relation with the outlet, the plane of the screen being perpendicular to the longitudinal center line of the container, and a filter of granular material for the container intermediate the screen and the inlet and adapted to cover the inlet in the horizontal position of the container and the screen in the vertical position thereof.

AMOS CAHAN.

REFERENCES CITED

The following references are of record in the file of this patent:

UNITED STATES PATENTS

| Number | Name | Date |
| --- | --- | --- |
| 2,212,318 | Gee | Aug. 20, 1940 |
| 2,261,037 | Schwab | Oct. 28, 1941 |
| 2,313,219 | Bulling | Mar. 9, 1943 |
| 2,385,407 | Endress | Sept. 25, 1945 |
| 2,470,943 | Page | May 24, 1949 |